Nov. 21, 1939.  C. PECKAT  2,180,909
AWNING FOR AUTOMOBILES
Filed June 29, 1939   2 Sheets-Sheet 1
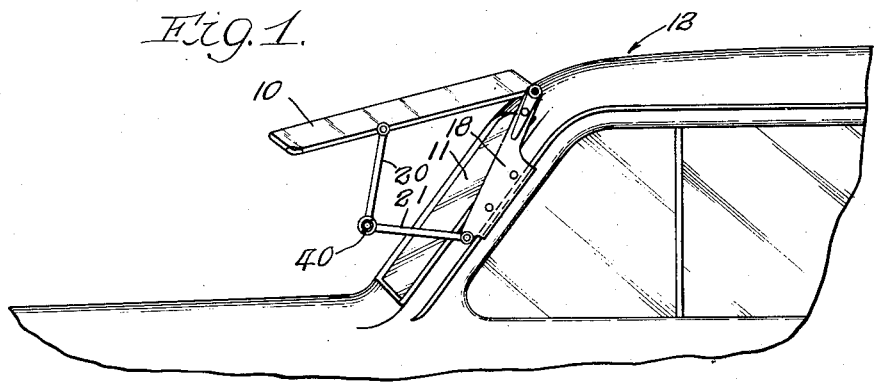
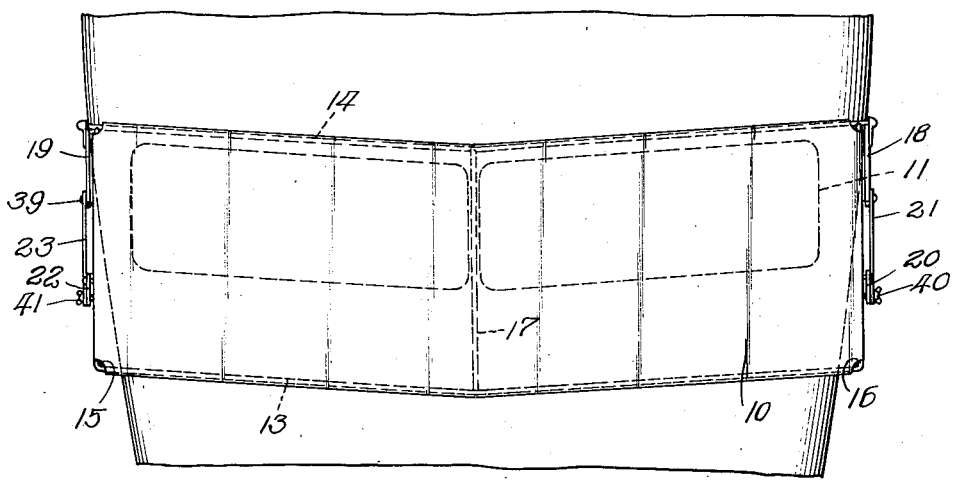
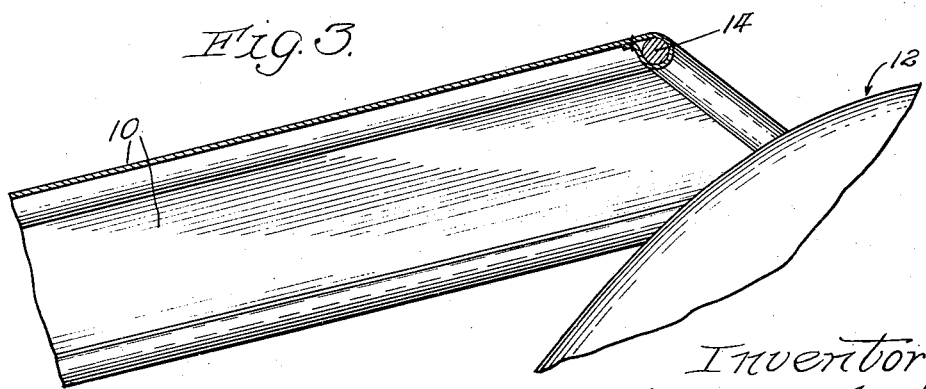
Inventor:
Charles Peckat,
By Churton, Wiles, Davies, Hirsch & Dawson
Attys.

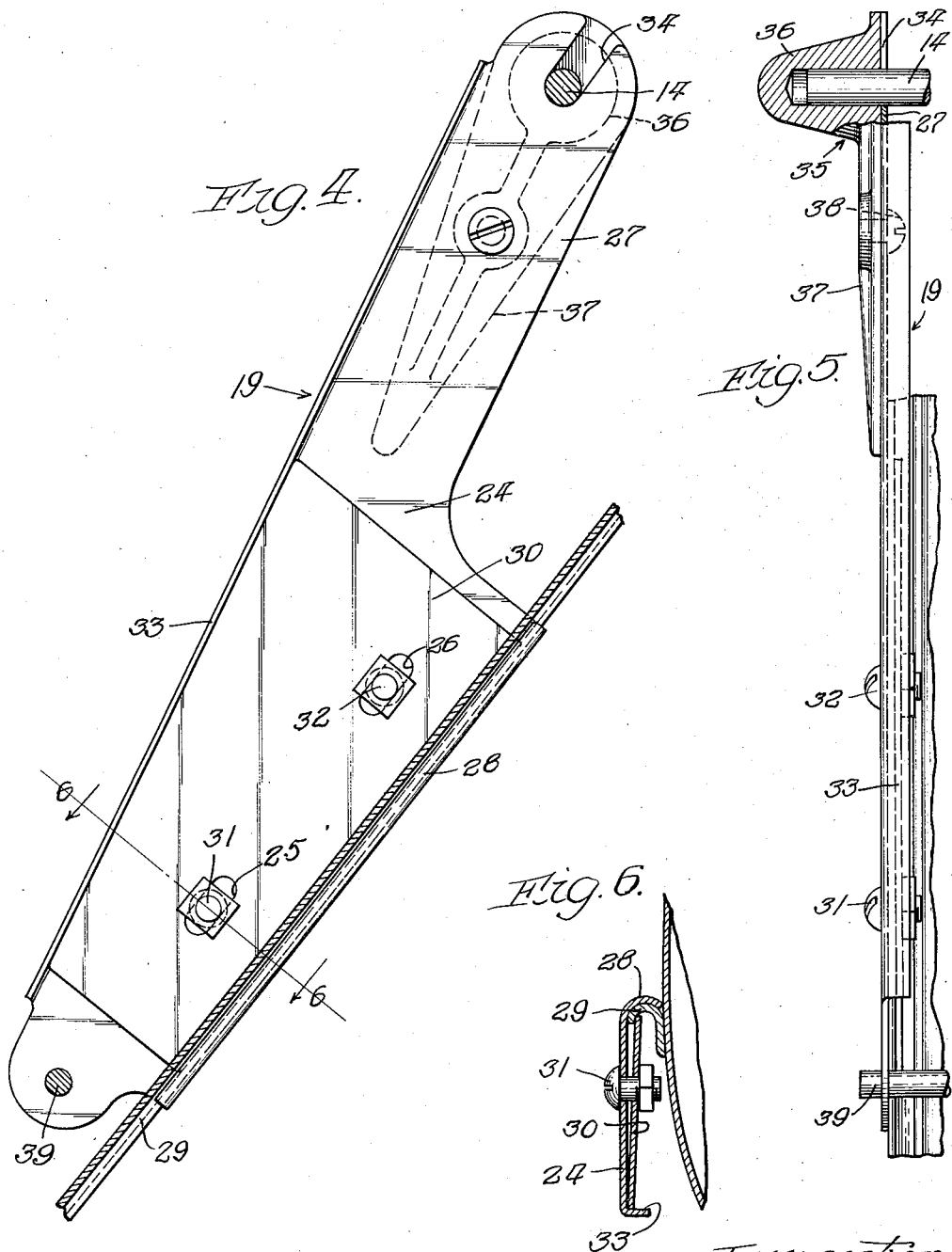

Patented Nov. 21, 1939

2,180,909

UNITED STATES PATENT OFFICE 2,180,909

AWNING FOR AUTOMOBILES

Charles Peckat, River Forest, Ill.

Application June 29, 1939, Serial No. 281,956

8 Claims. (Cl. 296—95)

This invention relates to an awning for the windshield of an automobile, and more particularly to improved supporting means therefor.

One feature of this invention is that it enables convenient use of an awning over and projecting forwardly of the sloping windshield of a modern automobile; another feature of this invention is that it enables the position of the awning to be readily adjusted; yet another feature is that the awning is supported in the desired position without drilling any holes through or otherwise marring the body of the automobile; and a further feature is that part of the supporting means may be left in place on the automobile, if desired, when the awning and the rest of the supporting means is removed; other features and advantages of this invention will be apparent from the following specification and the drawings, illustrating in schematic form an embodiment of my invention.

Figure 1 is a partial side elevation of an automobile with the awning and supporting means in place thereon; Figure 2 is a partial top plan view of the structure shown in Figure 1; Figure 3 is a detailed view, partly in section, showing the spacing between the awning and the body of the car; Figure 4 is a detailed elevational view of one of the supporting brackets in place on the car; Figure 5 is an edge view of the bracket shown in Figure 4; and Figure 6 is a fragmentary detailed sectional view along the line 6—6 of Figure 4.

For the past few years the tendency in automobile design practice has been to provide more and more slope to the windshield; and in the past year the windshield area has been considerably increased. While this has certain desirable advantages in other respects, it is particularly undesirable, in warm weather, when driving in a direction where the sun is forward of the car, even though only slightly so. The sun then shines directly through the windshield onto the knees and lap of the driver and any other passengers in the front seat, and if it is in the early morning or late afternoon, even on the bodies of such persons. The effect of this direct sunlight is to make the parts of the person or persons exposed to it many degrees hotter than the air temperature; and this is particularly uncomfortable where the air temperature is already high.

Various attempts have heretofore been made to provide awnings to prevent passage of direct sunlight through the windshield of an automobile; but these previous attempts have all had a number of objectionable difficulties, particularly in connection with the means used to support them in place. My invention obviates the objections of these previous awnings by providing improved supporting means for the awning, adapted to be removably yet rigidly attached to the body adjacent the windshield without the necessity of drilling any holes or in any other way marring the car. In the particular embodiment of my invention illustrated herewith an awning 10 is shown supported in the desired position over and extending forwardly of the windshield 11 of an automobile and a body 12, as may be best seen in Figures 1 and 2. The awning is here shown as comprising two panels or sections defined by the frame on which the rubberized canvas material of the awning is fastened. The awning frame comprises forward and rear rods 13 and 14 extending the width of the car; side rods 15 and 16; and a center rod 17. The awning is preferably positioned so that the rear bar 14 is spaced above and away from the top of the windshield, as may be best seen in Figure 3, to permit the passage of air therethrough while the automobile is being driven. As may be best seen in Figure 1, I desire to locate my awning so that the rear edge thereof is substantially vertically above the top of the windshield, and so that the awning extends sufficiently far forwardly of the bottom of the windshield to provide the desired protection against the sun, even in the early morning or late afternoon.

In order to maintain my awning in the desired position I provide supporting means in the form of brackets 18 and 19 and bendable arms comprising the parts 20 and 21 on the one side and 22 and 23 on the other side. Inasmuch as the supporting means provided on each side of the awning duplicate each other, I will describe only in detail the means on one side, in this case the means on the left, speaking with respect to Figure 2.

Referring more particularly to Figures 4, 5 and 6, the bracket 19 will be seen to comprise a principal body portion 24 of flat heavy gage sheet metal, the edges being formed at an angle to this body portion to add strength and rigidity, and to enable attachment to the rain gutter of the car, as will be hereinafter more fully described. The body 24 of the bracket member has elongated slots 25 and 26 therethrough, these slots being considerably spaced and arranged parallel to the right hand edge of the bracket, speaking with respect to Figure 4. It will be noted that the two upturned edges of the bracket member are in parallel, but converge toward the lower end; and that the body portion is cut away at the top to provide an upwardly extending reduced portion 27.

The right hand edge (speaking with respect to Figure 4) of the bracket member, as may be best seen in Figure 6, is formed or turned up to provide an arcuate portion 28 designed to conform to the lower surface of the rain gutter 29. In the modern automobile these rain gutters extend along over the windows on each side of the body, and down the corner posts on each side of the windshield, where they provide a sloping straight portion of considerable length.

A wedge-shaped plate 30 is adapted to lie on the body portion 24 of the bracket and to have a shape which conforms in general to that of the body portion; that is, the edges of the plate 30 are at substantially the same angle to each other as are the edges of the body portion. The plate is provided with circular openings of substantially the same diameter as the width of the slots 25 and 26, and these openings are so arranged as to register with the slots. Each cooperating pair of openings is adapted to have a bolt passed therethrough, as the bolts 31 and 32.

In order to install the bracket to the side of the windshield the bolts 31 and 32 are first loosened or removed entirely. The curved edge 28 of the bracket member is then placed under the gutter in the desired position for the bracket. The edge of the plate 30 nearest the gutter is brought into engagement with the inner surface of the gutter, as shown best in Figure 6, and the plate is then wedged or driven toward the lower end of the bracket, as by light blows of a hammer. The outer edge of the plate cooperates with the inclined edge 33 of the body of the bracket to provide an action which forces the other edge of the plate tightly against the inner surface of the gutter to firmly grip the gutter between it and the curved edge 28 of the bracket member. Tightening the bolts 31 and 32 then provides a firm assembly adapted to act as a supporting means for the awning.

The upper projecting portion 27 of the bracket is provided with a slot 34 at the upper end adapted to receive the end of the back frame rod 14 of the awning, the ends of this rod acting as trunnions on which the awning may pivot. A bearing member 35, which may be cast with an upper enlarged portion 36 to provide a bearing for the end of the rod 14 (as may be best seen in Figure 5) and a downwardly extending portion 37, is adapted to be removably attached to the portion 27. The means for doing this is here shown as a stud 38 adapted to pass through an opening in the portion 27 of the bracket member and to be threaded into the depending portion 37 of the bearing member.

When the brackets 18 and 19 are in place on each side of the windshield the rod 14 is slipped into the openings in each of the upper projecting portions of the brackets. The bearing members are then slipped over the trunnion ends of the rod 14 and fastened in place, as by tightening up the bolt 38. The adjustable supports for the forward end of the awning are then placed in position. The arm 23, for example, may be pivotally connected to the lower end of the bracket 19 by a bolt 39 passing through an opening provided therefor in the arm and bracket. The forward or upper ends of the arms 20 and 22 are pivotally connected to the side rods of the awning; and the cooperating arms on each side of the awning may then be joined together, as by the wing nuts 40 and 41.

Each pair of arms on each side of the awning are similarly joined together, and therefore only one such connection will be described. The arms 20 and 21, for example, are provided with circular disk-like portions adapted to be concentrically mounted about the stud on which the wing nut 40 operates. The inner faces of these disk-like portions are serrated or radially grooved. This enables the angle between the arms, and thus the position of the forward end of the awning, to be adjusted to any desired point; but ensures a firm and rigid lock connection to maintain the awning in the desired position when the wing nuts 40 and 41 are drawn up tight.

While I have described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for supporting an awning in the desired position with respect to the windshield of an automobile having gutters adjacent said windshield, including: a pair of members adapted to be clamped to the gutters on each side of the windshield; and means carried by the members for supporting the awning in said position.

2. Apparatus of the character described for supporting an awning in the desired position with respect to the windshield of an automobile having gutters adjacent said windshield, including: a pair of members adapted to be clamped to the gutters on each side of the windshield and to make supporting engagement with the back end of the awning; and means for adjustably supporting the front end of the awning.

3. Apparatus of the character described for supporting an awning in the desired position with respect to the windshield of an automobile having gutters adjacent said windshield, including: a pair of members adapted to be clamped to the gutters on each side of the windshield and to make supporting engagement with the back end of the awning; and means for adjustably supporting the front end of the awning, said means including a pair of concentrically mounted disk members adapted to have serrated surfaces engage each other.

4. Apparatus of the character described for supporting an awning, having laterally extending trunnions at the back end thereof, in the desired position with respect to the windshield of an automobile having gutters adjacent said windshield, including: a pair of members adapted to be clamped to the gutters on each side of the windshield, said members having slots at the upper ends thereof adapted to receive said trunnions; bearing members adapted to be removably attached to the first mentioned members to maintain the trunnions in the slots while providing bearings permitting pivotal movement thereof; and means for adjustably supporting the front end of the awning.

5. Apparatus of the character claimed in claim 4, wherein the last mentioned means comprises a pair of devices, each including two pivotally connected arms adapted to be adjusted to and locked at any desired angle.

6. A member of the character described adapted to provide support for the front and back ends of an awning to maintain it in a desired position with respect to the windshield of an automobile having gutters adjacent said windshield, including: a body portion; and edge portion adapted to conform to one side of a portion of one of said gutters; and means mounted on the body portion adapted to engage the other side of the gutter to grip it between the edge portion and the last mentioned means.

7. Apparatus of the character claimed in claim 6, wherein the last mentioned means is so constructed and arranged as to be driven into wedging engagement with the gutter.

8. Apparatus of the character claimed in claim 6, wherein the member has an end portion extending up and away from the gutter and the end portion is provided with a slot and is adapted to have a bearing member removably mounted thereon.

CHARLES PECKAT.